United States Patent [19]

Levi et al.

[11] Patent Number: 5,011,319

[45] Date of Patent: Apr. 30, 1991

[54] LOCKING MECHANISM FOR TELESCOPING TUBULAR POLES

[75] Inventors: Avraham Y. Levi, St. Paul; Craig D. Quarberg, Brooklyn Park, both of Minn.

[73] Assignee: A.C. Innovations, Inc., Bloomington, Minn.

[21] Appl. No.: 459,641

[22] Filed: Jan. 2, 1990

[51] Int. Cl.⁵ ............................................. F16B 7/10
[52] U.S. Cl. .................................... 403/109; 403/351
[58] Field of Search ............... 403/350, 351, 352, 297, 403/109, 367

[56] References Cited

U.S. PATENT DOCUMENTS

| | | | |
|---|---|---|---|
| 1,115,057 | 10/1914 | Delaney | 403/351 X |
| 2,526,415 | 10/1950 | Refsdal | 403/351 |
| 2,873,129 | 2/1959 | Edmundson | 403/352 |
| 3,419,293 | 12/1968 | Conrad | 403/351 |
| 3,515,418 | 6/1970 | Nielsen, Jr. | 403/109 |
| 3,596,946 | 8/1971 | Burton | 403/109 |
| 4,076,437 | 2/1978 | Mazzolla | 403/350 |
| 4,294,560 | 10/1981 | Larkin | 403/351 X |
| 4,632,597 | 12/1986 | Clausen et al. | 403/351 |
| 4,856,929 | 8/1989 | Smahlik et al. | 403/297 |

Primary Examiner—Peter M. Cuomo
Attorney, Agent, or Firm—Haugen and Nikolai

[57] ABSTRACT

A lock for selectively allowing and preventing longitudinal displacement of an outer and inner telescoping tube segments comprises a plug member fastened to one end of the inner tube segment which includes a S-shaped cam projecting outwardly for cooperating with a pair of cam followers that are shaped so that when the inner tube segment is rotated in a first direction relative to the outer one, the two cam followers are drawn out of contact with the inside surface of the outer tube segment. When the inner tube is rotated in the opposite direction, the cam forces the cam followers radially outward so as to abut with substantial friction the inner surface of the outer tube segment.

16 Claims, 2 Drawing Sheets

LOCKING MECHANISM FOR TELESCOPING TUBULAR POLES

BACKGROUND OF THE INVENTION

I. Field of the Invention

This invention relates generally to a locking mechanism for telescoping extendable pole segments and more particularly to an improved internal cam mechanism which, upon a quarter turn of one pole segment relative to the other, with only a modest force, the two pole segments become rigidly locked together against relative longitudinal movement.

II. Discussion of the Prior Art

There are many applications where it is advantageous to have an extendable pole so that the overall length of the pole assembly can be adjusted. For example, the legs on a camera tripod may comprise two or more telescoping tubular segments whereby the height of the camera above ground can be adjusted by extending or retracting inner tubular pole segments relative to an outer segment. Likewise, in fruit picking or tree trimming applications, one may wish to provide a telescoping pole wherein the segments are collapsed relative to one another during storage but extendable when it is desired to reach a branch which is at a height greater than the length of the collapsed pole assembly. Once the desired length is reached by extending the inner pole segment relative to the outer pole segment, it often is desirable to lock that longitudinal adjustment. It is also desirable that the locking maneuver be simple and quick to accomplish with a minimum of fumbling.

In one prior art arrangement, the outer and inner tubular pole segments are provided with a series of apertures and when a desired extension length has been arrived at, it is necessary to insert a pin through the aligned apertures to maintain the overall length setting.

In applicant's co-pending application Ser. No. 07/280,124 filed Dec. 5, 1988, now U.S. Pat. No. 4,899,849, there is disclosed a ladder stabilizing assembly in which a pair of extendable, tubular, telescoping legs are hinged to the ladder's side rails and can be deployed to inhibit any tendency for the ladder to tip or slide. The telescoping legs includes a cam lock arrangement in which an eccentric disk secured to the inner tubular leg creates a wiping interference fit relative to the outer leg when the inner leg is rotated. The achieved locking force is primarily dependent on how much twisting force the user can impart between the two tube segments. The present invention comprises an improvement over that earlier arrangement for releasibly locking two tubular pole segments, one to the other, where the locking force is a large multiple of the force needed to engage the lock.

SUMMARY OF THE INVENTION

In accordance with the present invention, the locking mechanism for releasibly locking an inner and an outer cylindrical telescoping tube segment against relative longitudinal movement includes a plug member having a cylindrical stub insertable into one end of the inner tube segment with a tight friction fit to prevent relative rotation between the plug member and the inner tube segment. The plug member further includes a radially extending flange having a diameter which is greater than the outer diameter of the inner tube segment but less than the inner diameter of the outer tube segment. Extending outwardly from the flange and centrally disposed thereon is an elongated cam having a S-shaped cross-section made up of a central core having a circular cross-section and two integrally formed, oppositely extending fingers. Corresponding outer edges of each of the two fingers are tangent to the central core and corresponding inner edges of each of the two finger lie on a common center line passing through the center of the central core. Each of the fingers has a rounded end of a predetermined radius. Centered about the elongated cam are first and second cam followers which are arranged to fit within the outer tubular segment. The first and second cam followers have a generally circular profile over a predetermined arc less than 180° and formed inwardly from the chordal edge of the cam followers is an arcuate recess which subtends an arc of approximately 90°. These recesses receive the rounded ends of the fingers of the elongated cam therein. The length of the fingers and the depth of the recesses are such that with the inner tube segment and the plug member on the end thereof inserted into the outer tube segment, when the inner tube segment is turned in a first direction, the circular profile of the first and second cam followers are out of contact with the inside surface of the outer tube segment whereby longitudinal sliding movement between the inner and outer tube segments may take place. However, when the inner tube segment is turned in a second direction, opposite to the first, the circular profiles of the first and second cam followers engage the inner surface of the outer tube segment to prevent longitudinal relative movement therebetween.

One advantage of the above arrangement over known prior art locking mechanisms resides in the fact that the amount of longitudinal force between the inner and outer tube segments before any slippage will take place can be varied to suit the particular application by merely adjusting the length of the cam follower segments and thus the degree of friction which must be overcome. A further advantage resides in the design of the locking mechanism whereby a modest radial locking force for spreading the cam followers is evenly divided and greatly multiplied in terms of the longitudinal force applied to the telescoping poles before any slippage will occur. Moreover, only a few simple molded parts are involved leading to a very low cost.

DESCRIPTION OF THE DRAWINGS

The following features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
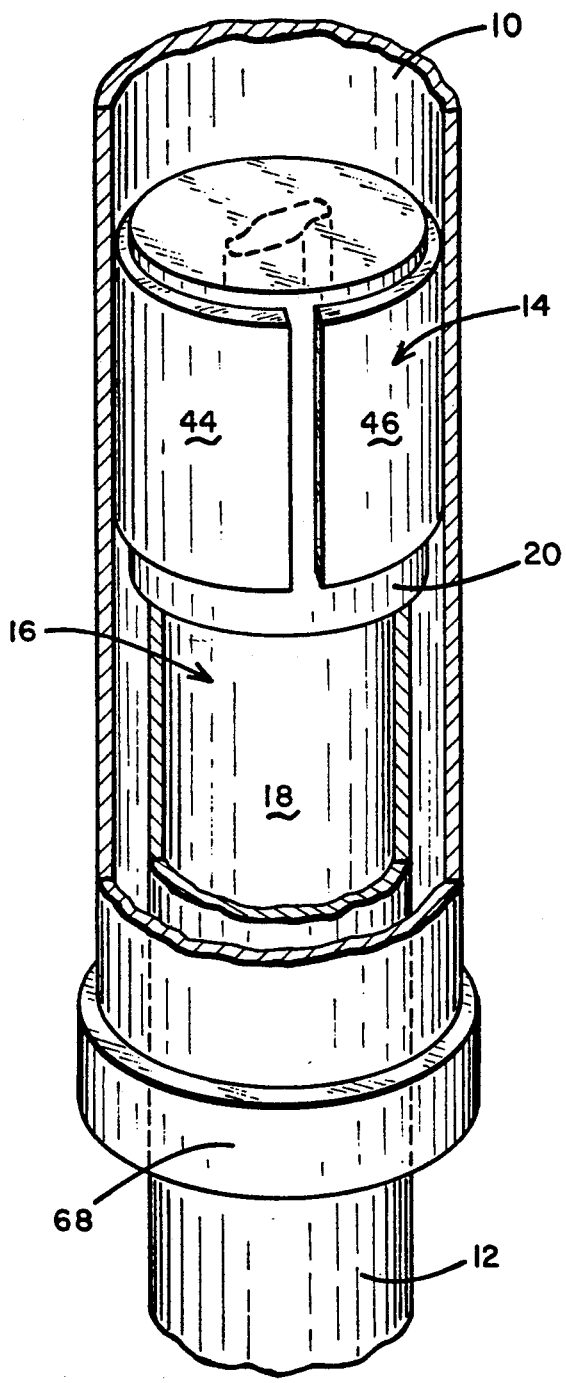
FIG. 1 is a partially cross-sectioned perspective view illustrating the preferred embodiment.

Referring first to FIG. 1, numeral 10 identifies an outer tube segment and numeral 12 identifies an inner tube segment which is telescopingly received within the central opening of the tube segment 10. Numeral 14 indicates generally the locking mechanism that permits the inner tube segment 12 to be releasibly locked at a desired location within the outer tube segment 10. The tubes 10 and 12 may be formed from various types of materials including aluminum, fiberglass or any one of a number of other metals or plastics. The locking mechanism 14 is seen to comprise a plug member 16, more particularly illustrated in the perspective view of FIG. 2. The plug member consists of a generally cylindrical stub 18 which is fitted into the central opening of the inner tube 12. It is swaged or otherwise fastened so that the stub 18 is not free to move relative to the inner tube 12. Formed on the upper surface of the stub 18, as viewed in FIG. 2, is a radially extending flange 20 whose diameter is greater than the outer diameter of the inner tube segment 12 but less than the inner diameter of the outer tube segment 10.

Figure 2:
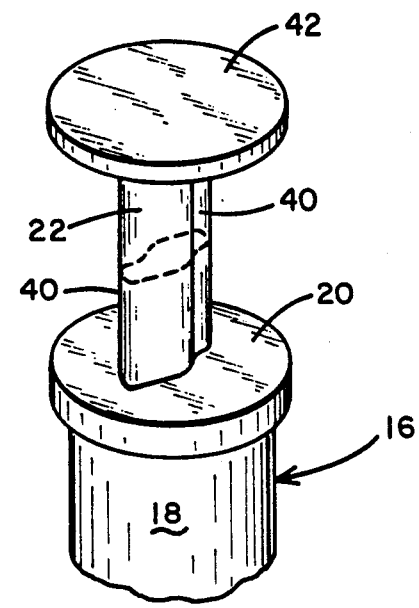
FIG. 2 is a perspective view of the plug member.
Figure 3:
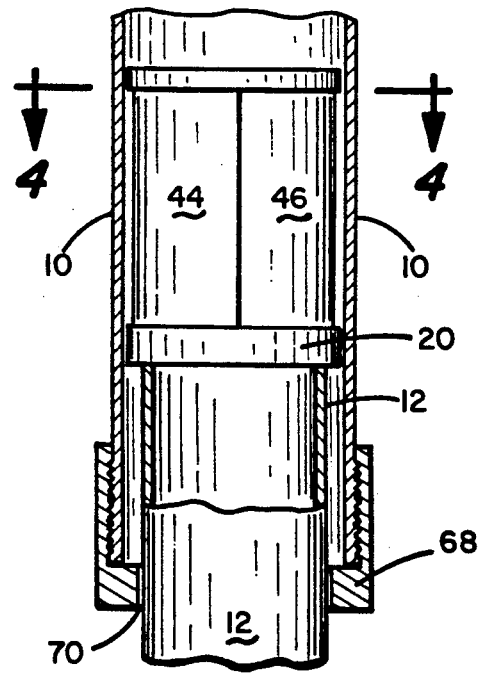
FIG. 3 is a cross-sectioned frontal view of the locking mechanism.
Figure 4:
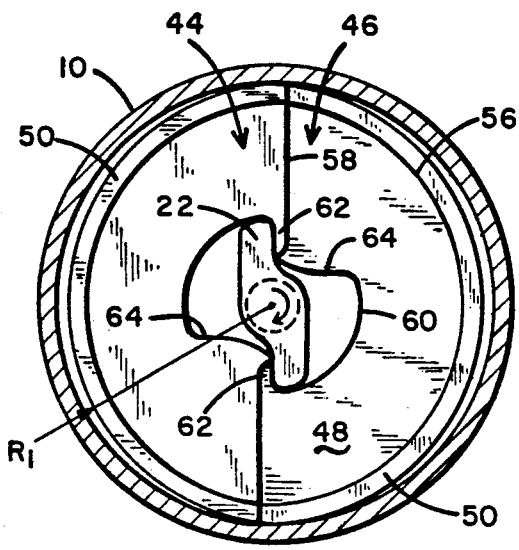
FIG. 4 is a sectional view taken along the line 4—4 in FIG. 3 with the locking mechanism disengaged.
Figure 5:
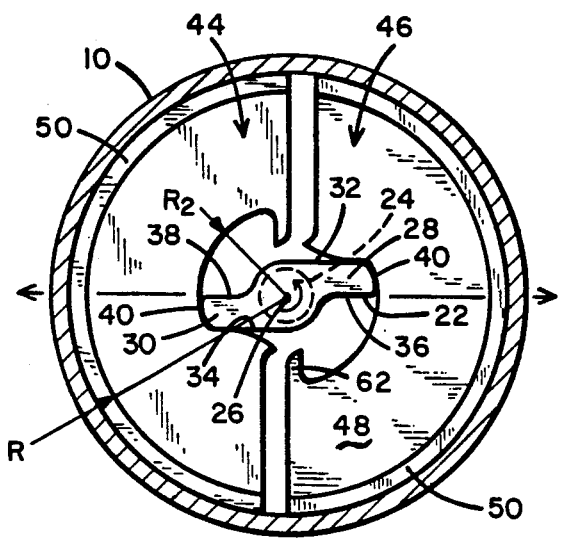
FIG. 5 is a cross-sectional view like that of FIG. 4 except with the lock mechanism engaged.

With continued reference to FIG. 2, projecting upward from the top surface of the radial flange 20 is a cam member 22 which, as best illustrated in FIGS. 4 and 5, has a somewhat S-shaped cross-section. It may be thought of as having a central core delineated by the dotted line circle 24 whose center 26 is aligned with the center of the stub 18 and the flange 20. Projecting in opposite directions from the central core 24 are two integrally formed fingers 28 and 30 whose corresponding outer edges 32 and 34 are tangent to the circular central core 24 of the cam and whose corresponding inner edges 36 and 38 fall on a common center line passing through the center 26 of the central core 24. The ends of the fingers 28 and 30 are rounded at a predetermined radius, as at 40, for purposes which will become apparent as the description of the invention continues. As illustrated in FIGS. 1 and 2, a second radially extending flange or cap 42 is integrally formed or otherwise fastened to the upper end of the cam 22.

Figure 6:
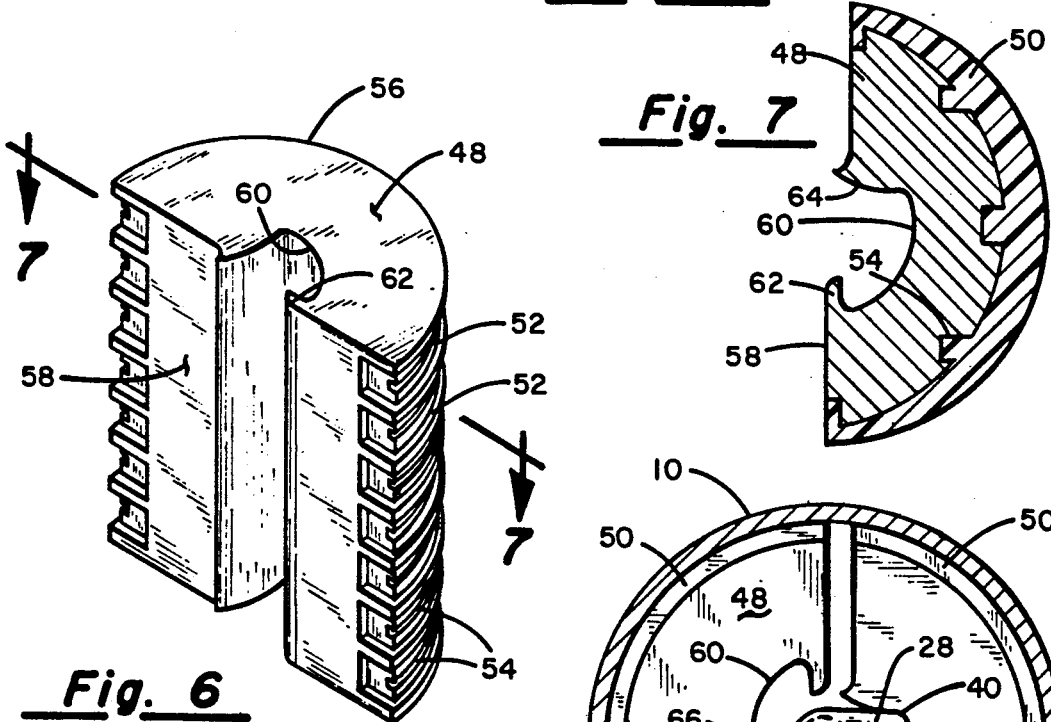
FIG. 6 is a perspective view of the core portion of one of the cam follower segments.
Figure 7:
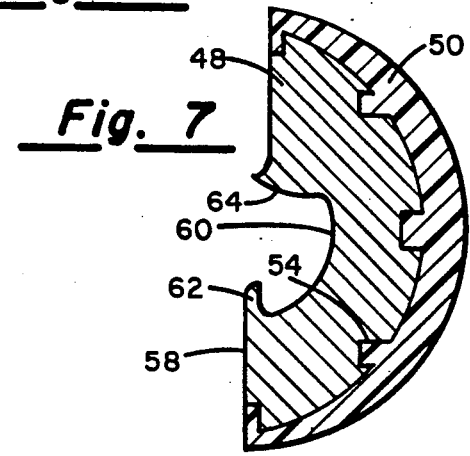
FIG. 7 is a cross-sectional view of the core taken along the lines 7—7 in FIG. 6 but with the elastomeric covering layer thereon.

Disposed between the flange 20 and the flange 42 are first and second cam followers which are identified generally by numerals 44 and 46. With reference to FIGS. 6 and 7, it can be seen that the cams include a molded plastic or metal core 48 and an outer covering of an elastomeric material exhibiting a high coefficient of friction relative to the inner surface of the outer pole 10. The coating layer is sleeve-like and identified by numeral 50 in FIG. 7. It has been found that Neoprene ® synthetic rubber serves quite well as the coating layer in most applications.

With reference to FIG. 6, the exterior of the core 48 of the cam followers 44 and 46 includes a plurality of outwardly projecting ribs as at 52 and inwardly formed grooves as at 54 intermediate the ribs 52. As the elastomeric coating 50 is formed on the core 48 in a molding operation or otherwise, the grooves and ribs serve to better hold the Neoprene sleeve 50 onto the core and prevent longitudinal directed shearing forces applied to the coating layer 50 from causing that coating layer or sleeve to sluff off.

Figure 8:
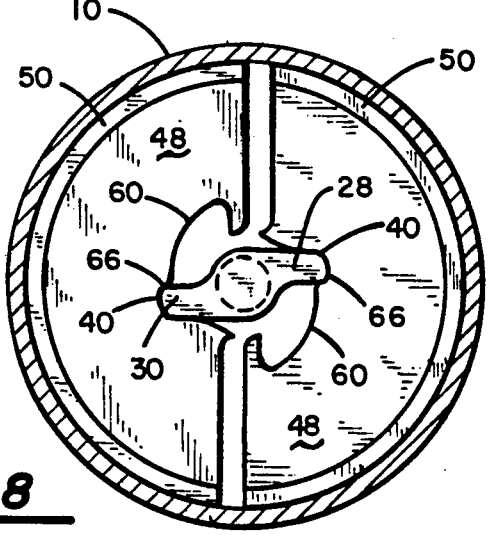
FIG. 8 is a sectional view like that of FIG. 5 but incorporating a locking detent feature.

The core 48 of the cam followers 44 and 46 have a generally circular profile over a predetermined arc as at 56 which is slightly less than 180°. Extending inward from a chordal edge 58 thereof is an arcuate recess 60 which subtends an arc of about 90° between a tooth-like stop 62 and the recess edge surface 64. The cam follower cores 48 are identical in shape and when fitted together between the flange 20 and the cap 42 of the plug 16, the arcuate recesses 60 fit about the cam 22 in the manner best illustrated in FIGS. 4 and 5 of the drawings. By gripping the poles 10 and 12, one in each hand, and rotating one relative to the other, when rotated in a first direction as illustrated in FIG. 4, the fingers 28 and 30 on the cam will reach the tooth-like stops 62 and will cause the abutting chordal edges of the cam followers to become nested relative to one another to thereby reduce the overall radius $R_1$ of the nested cam followers to the point where a predetermined clearance (e.g. 0.020") exits between the exterior surface of the elastomeric coating 50 and the inside surface of the outer pole 10. When, however, the two poles are twisted relative to one another in the opposite direction as indicated in FIG. 5, the rounded ends 40 of the fingers will follow the radius $R_2$ of the arcuate recesses 60 spreading the cam followers apart until the edges 32 and 34 of the cam abut the walls 64. At this point, the follower elements are spread apart from one another a sufficient distance (e.g. 0.040") so that the elastomeric layer 50 is squeezed against the inside surface of the outer tube 10 with a predetermined looking force (FIGS. 1 and 5). The co-efficient of friction of the elastomeric material relative to the material of the outer pole is such that a very substantial force is needed to either push or pull the inner tube 12 relative to the outer tube 10. It should be apparent to those skilled in the art that the amount of force that can be accommodated may be adjusted by either appropriately determining the length dimension of the cam followers and the overall length of the cam 22 so that a greater or less surface of elastomeric coating is in contact with the inner wall of the outer tube 10 or by setting the length of fingers 28 and 30 relative to the depth of the arcuate recess 60 and the dimensions of the core pieces 48 to establish the amount of radial force between the follower elements and the I.D. of the pole 10. In the arrangement shown in FIG. 8, the arcuate recess 60 includes a rounded groove 66 which functions as a detent for the cam fingers 28 and 30 by receiving the rounded ends 40 therein when the cam is rotated to the locked position. This detent requires a certain torque be applied before unlocking occurs.

To preclude the two poles from separating relative to one another, it has been found convenient to affix a collar, such as 68, to the lower end of the outer tube 10 where the collar includes an inwardly extending flange 70 which, while not touching the outside wall of the inner tube 10, will engage the undersurface of the flange 20 as the inner tube segment 12 is pulled downward to its limit.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Apparatus for releasibly locking inner and outer cylindrical telescoping tube segments against longitudinal movement relative to one another, comprising:
   (a) a double lobed cam element attached to one end of said inner tube segment for rotation therewith; and
   (b) first and second cam followers each being of substantially semi-circular cross-section and of a predetermined length dimension, each including an arcuate recess extending inward from a chordal edge and subtending an angle of about 90 degrees between a pair of stop surfaces located at opposed ends of said arcuate recess, said arcuate recesses in said first and second cam followers each receiving one of said double lobes of said cam, said first and second cam followers and said cam being insertable into the bore of said outer tube segment, rotation of said cam in a first direction against one of said pair of stop surfaces spreading said cam followers apart from one another against the inner wall of said outer tube segment and rotation of said cam in a direction opposite said first direction to the other of said pair of stop surfaces drawing said first and second cam followers together and out of contact with said inner wall of said outer tube segment.

2. The apparatus as in claim 1 wherein said first and second cam followers comprise a core formed of a non-resilient material and a coating of an elastomeric material on the exterior arcuate surfaces thereof.

3. The apparatus as in claim 2 wherein said elastomeric material is Neoprene synthetic rubber.

4. The apparatus as in claim 2 wherein said core of non-resilient material is shaped such that when said elastomeric material abuts said inner surface of said outer tube segment, the arcuate surfaces of said core of non-resilient material comprises the circumference of a circle whose center is the longitudinal axis of said cam.

5. The apparatus as in claim 2 wherein said core of non-resilient material is shaped such that when said elastomeric material is out of contact with inner surface of said outer tube segment, the exposed arcuate surface of said elastomeric material comprises the circumference of a circle whose center is the longitudinal axis of said cam.

6. Apparatus for releasibly locking inner and outer cylindrical telescoping tube segments against longitudinal movement relative to one another comprising:
   (a) a plug member having a cylindrical stub insertable into one end of said inner tube segment and affixed thereto to prevent relative rotation between said plug member and said inner tube segment, said plug member including a longitudinally projecting cam centrally positioned on said plug member, said cam having a central core of circular cross-section and two integrally formed, oppositely extending, fingers with corresponding outer edges of each of said two fingers being tangent of said central core and corresponding inner edges of each of said two fingers being on a common center line passing through the center of said central core, each of said finger having a rounded end of a predetermined radius; and
   (b) first and second cam followers centered about said cam, said first and second cam followers having a generally circular profile over a predetermined arc which is less than 180° and each including an arcuate recess extending inward from a chordal edge thereof and subtending an arc of about 90°, each recess in said first and second cam followers receiving said rounded end of one of said two fingers therein, the length of said fingers and depth of said recesses being such that with said inner tube segment and said plug member inserted into said outer tube segment and said inner tube segment turned in a first direction, said circular profile of said first and second cam followers are out of contact with the inside surface of said outer tube segment, allowing longitudinal sliding movement between said inner and outer tube segments and when said inner tube segment is turned in a second direction, opposite said first direction, said circular profiles of said first and second cam followers engage said inner surface of said outer tube segment to prevent longitudinal relative movement therebetween.

7. The apparatus as in claim 6 wherein said first and second cam followers comprise a core formed of a non-resilient material and a coating of an elastomeric material thereon creating said generally circular profile.

8. The apparatus as in claim 7 wherein said elastomeric material is Neoprene synthetic rubber.

9. The apparatus as in claim 7 wherein said core of said first and second cam followers includes an irregular surface on which said coating is formed.

10. The apparatus as in claim 9 wherein said irregular surface includes a series of longitudinal spaced ribs and grooves.

11. The apparatus as in claim 7 wherein said core of non-resilient material is shaped such that when said elastomeric material abuts said inner surface of said outer tube segment, the arcuate surface of said core of non-resilient material comprises the circumference of a circle whose center is the longitudinal axis of said cam.

12. The apparatus as in claim 7 wherein said core of non-resilient material is shaped such that when said elastomeric material is out of contact with said inner surface of said outer tube segment, the exposed arcuate surface of said elastomeric material comprises the circumference of a circle whose center is the longitudinal axis of said cam.

13. The apparatus as in claim 7 wherein said core of non-resilient material of each of said cam followers includes first and second stop means disposed at respective ends of said arcuate recess, said first stop means, when engaged by said fingers as said cam is rotated in said first direction, forces said first and second cam followers together along said chordal edges.

14. The apparatus as in claim 13 and further including a detent groove in said arcuate recess proximate said second stop means.

15. The apparatus as in claim 6 wherein said plug member further includes a first radially extending flange of a diameter greater than the outer diameter of said inner tube segment and less than the inner diameter of said outer tube segment located on a first end of said cam and a further radially extending flange on a second end of said longitudinally projecting cam and said first and second cam followers surround said cam between said first radially extending flange and said further radially extending flange.

16. The apparatus as in claim 6 and further including an annular cap member affixed to the end of said outer tube segment through which said inner tube segment and said plug member is inserted, said cap member including a flange extending toward but short of said inner tube segment to cooperate as a stop with said first radially extending flange on said plug member as said inner tube segment is pulled outwardly from said end of said outer tube member.

* * * * *